Dec. 8, 1970  S. M. WENGEL  3,546,507
ELECTRIC MOTOR

Filed Oct. 17, 1966

Inventor
SHELDON M. WENGEL
BY
Prangley, Baird, Clayton, Miller & Vogel
ATTYS.

Dec. 8, 1970

S. M. WENGEL 3,546,507

ELECTRIC MOTOR

Filed Oct. 17, 1966

Inventor
SHELDON M. WENGEL
BY
Pringley, Baird, Clayton, Miller & Vogel
ATTYS.

Dec. 8, 1970    S. M. WENGEL    3,546,507
ELECTRIC MOTOR

Filed Oct. 17, 1966    3 Sheets-Sheet 3

Inventor
SHELDON M. WENGEL.
BY
ATTYS.

United States Patent Office 3,546,507
Patented Dec. 8, 1970

3,546,507
ELECTRIC MOTOR
Sheldon M. Wengel, 240 S. Oak,
Reedsburg, Wis. 53859
Filed Oct. 17, 1966, Ser. No. 587,052
Int. Cl. H02k 21/38
U.S. Cl. 310—156                                4 Claims

ABSTRACT OF THE DISCLOSURE

An impulse-type direct current electric motor adapted to be driven by small direct current batteries. The motor comprises a rotatably mounted permanent magnet, a plurality of at least three open-core field coils symmetrically disposed circumferentially about the path of rotation of the permanent magnet, and means for selectively and intermittently energizing the field coils to rotatatively drive the permanent magnet. The field coils are spaced radially outwardly from an axis of rotation of the permanent magnet, at a distance such that the opposite ends of the permanent magnet pass through the open ends of the field coils during rotation of the magnet.

---

This invention relates to small electric motors, and, more particularly, to small direct current electric motors of the impulse type.

Although the possible uses of small electric motors of the direct current impulse type are almost without number, most prior motors of this kind have, in fact, had rather limited application, in many cases, because of relatively-limited efficiency, low power, and because they have been relatively expensive of construction and assembly. In certain uses, such as, for example, in the field of mobile display advertising and the like, it is often necessary or desirable that the motor operate smoothly and substantially continuously for days on end, upon simple, ordinary dry-cell batteries, without service or attention of any kind. In many cases it is also essential that the motor be entirely self-starting and that it supply a relatively substantial amount of work energy. Furthermore, because the display item, or other device to be driven by the motor, is often of the throw-away type having little or no salvage value, it is often desirable or essential that the motor be so relatively inexpensive that it may also be discarded, without noticeable loss to its owner, when the item with which it is used is to be disposed of.

The prior motors of the direct current impulse type have not been entirely satisfactory in the fulfillment of these needs, and it is believed that the motor of the present invention provides an ideal solution to these problems.

The motor of the present invention involves the use of a permanent magnet as the motor rotor or armature and the use of stationary field coils having air cores. That is, the field coils have no magnetic materials serving as stationary cores therein. The motor is of novel construction and assembly, and the principal objects of the invention are to provide a motor of the general kind just referred to, which, because of its novel construction and assembly, has the combined advantages of high efficiency of operation, extremely-low manufacturing cost, self-starting from any and all positions of its rotor, and smooth and entirely-reliable operation for long periods of time. The motor has a minimum number of parts, all of which are very durable, inexpensive, and easy to assemble, and the larger of which parts, in the preferred form of the invention, are formed of nonmagnetic, synthetic, organic, plastic material, such as nylon or the like. The motor may easily be mass-produced because of its simple but novel construction.

These and other objects and advantages of the present invention will be apparent from the following description of a preferred embodiment thereof, taken with the accompanying drawings, wherein.

Figure 6:
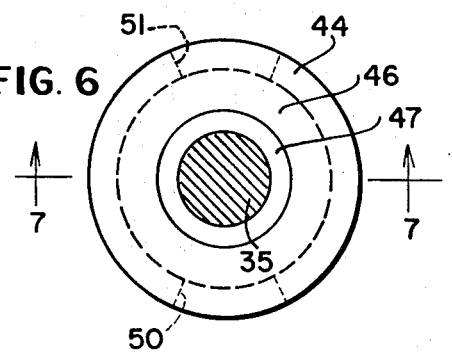
FIG. 6 is a top plan view of the commutator, as seen from above FIG. 5.
Figure 7:
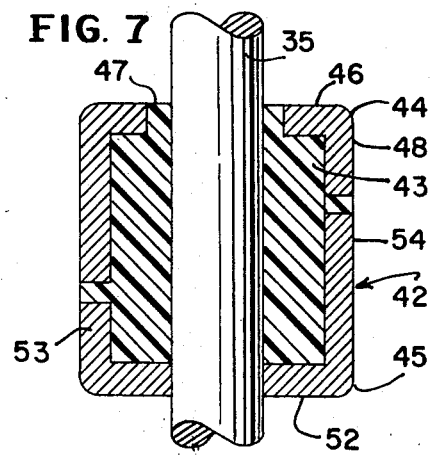

FIG. 7 is a cross-sectional view taken through the commutator substantially along the line 7—7 in FIG. 6; and FIGS. 8 to 13 are a series of schematic views showing the positional, functional, and magnetic relationships between the permanent magnet rotor, the field coils, the commutator, and the contacts within the motor during one complete revolution of the rotor, the rotor being represented as rotating in the clockwise direction and the successive views showing the conditions within the motor at each rotative interval of approximately 60 degrees.

Figure 1:
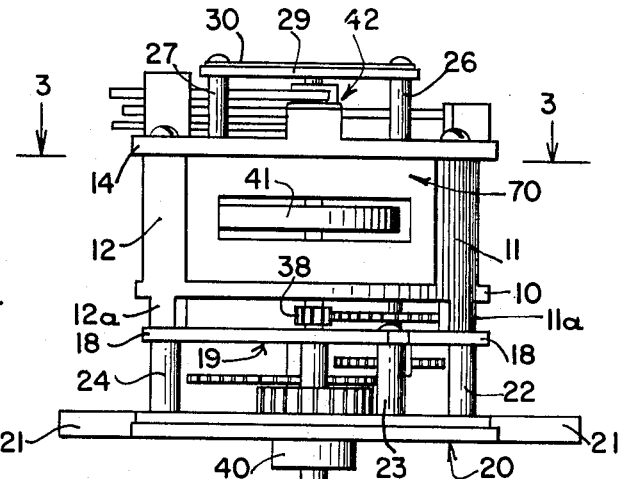
FIG. 1 is a side elevation of a motor constructed in accordance with the invention.
Figure 2:
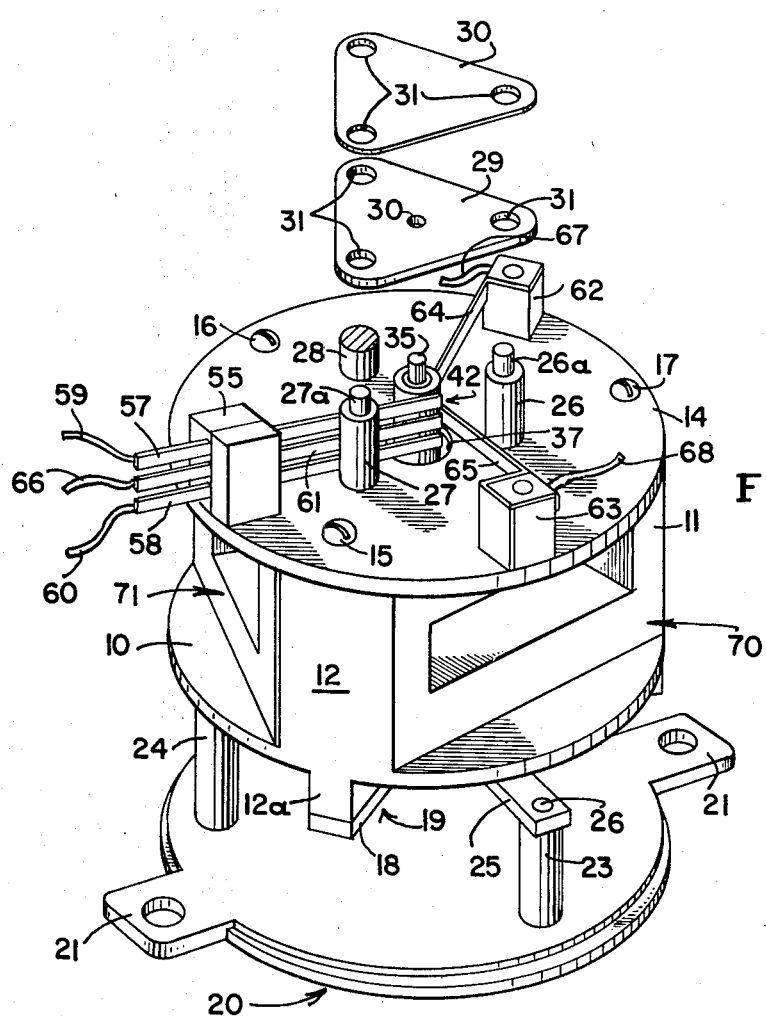
FIG. 2 is an enlarged perspective, partially exploded, view thereof taken from above and slightly to the left of FIG. 1, with a gear train that may be used with the motor omitted from the view.
Figure 3:
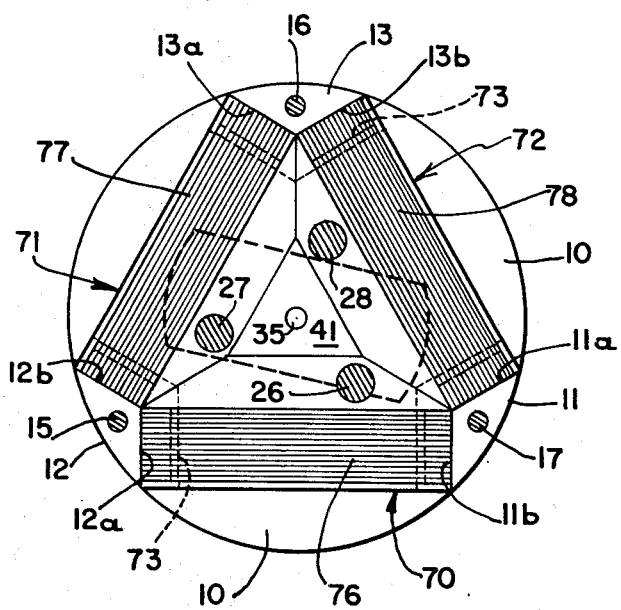
FIG. 3 is an enlarged cross-sectional view taken substantially along the line 3—3 of FIG. 1, to show the relationship between the field coil holders or bobbins and a frame employed in the motor, and to show the relationship of the permanent magnet-type rotor thereto.

Turning first to FIGS. 1 to 3, it will be seen that the main body or frame of the motor is comprised of a circular base plate 10, of molded nylon or the like, having three rigid, upstanding posts 11, 12, and 13 formed integrally thereon and located 120 degrees apart about the periphery of the plate. A second plate 14, likewise of nylon or the like, is securely mounted upon the free ends of the posts 11, 12, and 13 by means of three screws 15, 16, and 17 (see FIG. 2), each of which extends downwardly through its respective posts 11, 12, and 13 and also through a depending spacer block formed integrally on the under side of the plate 10 below the post. Only two of the spacer blocks, designated by the numerals 11a and 12a, are seen in the drawings (see FIGS. 1 and 2), but it will be understood that a third spacer block, like the blocks 11a and 12a, is integrally formed on the underside of the plate 10 below the post 13. The lower ends of the screws 14, 15, and 16 protrude through the undersides of the spacer blocks and are threadedly received in suitable threaded openings provided in radiating arms 18 of a brass or other metal bearing plate designated generally by the numeral 19. The screws 15, 16, and 17 thus firmly secure the upper plate 14 upon the upper ends of the posts 11, 12, and 13, and, at the same time, firmly secure the bearing plate 19, in spaced relationship below the plate 10, against the undersides of the spacer blocks 11a and 12a and against the other spacer block not shown.

A mounting plate 20, which may be formed of molded synthetic plastic and provided with radiating mounting lugs 21, is secured to the bearing plate 19 in spaced relationship thereto by means of a plurality of upstanding posts which may be formed integrally upon the mounting plate. Three such posts, designated by the numerals 22, 23, and 24, are employed in the embodiment of the motor shown in the drawings. The upper end of each of the posts 22, 23, and 24 is of reduced diameter and extends through an opening provided in additional radiating arms 25 formed on the bearing plate 19, the upper extremity of each post 22, 23, and 24 being melted over or otherwise spread, as at 26 (see FIG. 2), so as to fixedly secure the posts, and thus the mounting plate 20, to the bearing plate 19.

Confined between the frame plates 10 and 14, and between the upstanding posts 11, 12, and 13 of the plate 10, there are three identical field coil holders or bobbins 70, 71, and 72 which will be described in detail later herein. At this place in the description it is sufficient to say that the bobbins 70, 71, and 72 are each formed of molded nonmagnetic plastic, such as nylon, and they respectively have upstanding posts 26, 27, and 28 integrally formed thereon which extend upwardly through suitable closely-fitted openings provided in the upper plate 14. These posts respectively have upper-end portions 26a, 27a, and 28a of reduced diameter (see FIG. 2) which receive thereon, in stacked relationship, a bearing plate 29 and a thrust plate 30, each of the plates 29 and 30 being of brass or the like and having openings 31 therein which fit about the upper-end portions of the posts. Like the upper-end portions of the posts 22, 23, and 24, the corresponding upper-end extremities of the posts 26, 27, and 28 may be melted over or otherwise spread to form rivet-like heads for fixedly securing the bearing plate 29 and the thrust plate 30 in place.

The motor is provided with an axially-extending rotor shaft 35, the upper end of which rotatably rides in a bearing opening 36 in the bearing plate 29 and against the underside of the thrust plate 30, and the lower end of which rotatably rides in a bearing opening (not shown) provided in the bearing plate 19. If desired or needed, the bearing plate 19 may be provided with a thrust plate, similar to the thrust plate 30, for preventing axial movement of the rotor shaft 35. It will, of course, be understood that the plastic plates 10 and 14 of the motor frame have over-size openings formed therein at their centers through which the shaft 35 freely extends, the opening in the plate 14 being designated by the numeral 37 in FIG. 2. The lower-end portion of the rotor shaft 35 may be utilized in any desired way for drive purposes, and in FIG. 1 the shaft is shown to have a pinion 38 fixed thereon for driving a co-operating speed-reducing gear train which may be of conventional construction and suitably mounted upon and between the bearing plate 19 and the mounting plate 20. Inasmuch as the gear train shown in FIG. 1 is of a conventional kind and is only representative of various such gear trains that may be employed, no detailed description thereof is believed to be necessary. The output end of the gear train, in any event, may comprise a power shaft 39 that rides in an "Oilite" or similar bearing suitably fixed in a central hub 40 formed on the mounting plate 20 and, if desired, the plastic mounting plate 20 may also be provided with other suitable metal bearing means for rotatably supporting the lower ends of the various intermediate shafts of the particular gear train employed. For purposes of simplicity of illustration, the gear train has been omitted from FIG. 2, inasmuch as it is not a part of the present invention per se and its illustration in FIG. 2 would in no way add to the understanding of the present description.

The central portion of the rotor shaft 35 has symmetrically fixed thereon a permanent magnet 41, preferably of "Lodex" material manufactured and sold in the United States by the General Electric Co., or the equivalent, the polar axis of the magnet being perpendicular to the axis of the shaft 35. The magnet is generally bar-shaped with its opposite ends preferably arcuate in shape, as best seen in FIG. 3, and the plane of the polar or longitudinal axis of the magnet, as the shape and magnet are rotated, is located substantially midway between and parallel to the plates 10 and 14.

Figure 5:
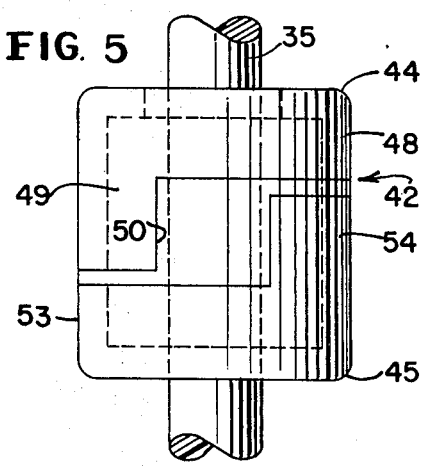
FIG. 5 is a greatly-enlarged fragmentary view showing, in elevation, a part of the motor shaft and a commutator which is mounted thereon.

Above the permanent magnet 41, and somewhat above the level of the plate 14, the rotor shaft 35 has a commutator fixed thereon, the commutator being designated generally by the numeral 42 in the drawings. The commutator, which is shown in detail in FIGS. 5, 6, and 7, is a three-piece structure having an insulating core 43 of "Teflon" or the like that is press-fitted onto the shaft 35 and carries an upper commutator member 44 and a lower commutator member 45, both of which are preferably formed of coin silver or other highly-conductive metal, the oxdies of which are conductive. Each of the commutator members, it will be seen, is generally annular and somewhat cup-shaped. The upper member 44 has an end wall 46 which fits around and is insulated from the shaft 35 by an upstanding axial projection 47 on the upper end of the core 43, and the upper member has a cylindrical wall 48 depending from the end wall 46 and providing an exterior 360-degree electrical contact surface. The wall 48 at one side thereof extends downwardly to provide a skirt 49 which is a segment of a cylinder having vertical side edges 50 and 51 that are at least 120 degrees apart and preferably are slightly further apart at approximately 124 degrees. The skirt 49 thus forms another contact surface of some 120 to 124 degrees. The lower commutator member 45 is identical to the upper member 44 except that it is inverted and is rotatively displaced 180 degrees from the latter, and its end wall 52 is in electrical contact with the shaft 35 at the center of the wall. Thus, the lower commutator member has a cylindrical wall 53 that provides another 360-degree exterior electrical contact surface and an upwardly-extending skirt 54, identical to the skirt 49 of the upper member, that provides another contact surface of 120 degrees to about 124 degrees. The insulating core 43 is so shaped that its exterior surface, at all places between the commutator members 44 and 45 and between the skirts 49 and 54 thereof, is cylindrical and has the same outer radius as the members 44 and 45 and their skirts. Thus, the over-all exterior surface of the commutator is smooth and entirely cylindrical. In the construction of the commutator, the commutator members 44 and 45 may be press-fitted onto the core 43, or the core may be molded in place between the spaced members 44 and 45, as desired.

The upper side of the plate 14 has an upstanding insulating block 55 formed thereon which, with a co-operating block 56 (see FIG. 2), fixedly holds a pair of reed-type power-supply brushes or contact members 57 and 58, the respective inner ends of which ride in constant electrical contact with the respective 360-degree contact surfaces provided by the walls 48 and 53 of the upper and lower commutator members 44 and 45. The brushes 57 and 58, as well as all of the other brushes hereinafter described, are preferably made of platinum, nickel, silver-rhodium alloy, or Phosphor bronze, or some other suitable highly-conductive metal, and the brushes 57 and 58 are respectively connected by leads 59 and 60 (see FIG. 2) to the respective positive and negative terminals of any suitable direct current source (not shown), such as a pair of ordinary flashlight batteries. It will be apparent later to those skilled in the art that the direction of rotation of the present motor may be reversed simply by reversing the leads 59 and 60. In the following present description, however, it is assumed, for purposes of illustration, that the lead 59 is connected to the positive terminal of the power source, and that the lead 60 is attached to the negative terminal, as indicated by the plus and minus signs in FIG. 2. With the leads so connected, it will be appreciated that the brush 57 causes the upper commutator member 44 and its skirt 49 constantly to be positive, and the brush 58 causes the lower commutator member 45 and its skirt 54 constantly to be negative.

A field coil brush 61 is mounted on the blocks 55, 56 between the power brushes 57 and 58 and in a position such that its inner end rides upon and tracks only with the skirts 49 and 54 of the commutator members, the inner end first being in contact with one skirt and then with the other as the shaft 35 and the commutator 42 rotate in a manner later to be described herein. The upper side of the plate 14 also has another pair of upstanding blocks 62 and 63 (see FIG. 2) integrally formed thereon, each being spaced about 120 degrees from the blocks 55, 56 and from each other. The block 62 has a second field coil brush 64 fixed thereto in any suitable manner, and the block 63 has a third field coil brush 65 similarly fixed thereto, the brushes 61, 64, and 65 being positioned so that their points of contact with the commutator 42, and more specifically with the skirts 49 and 54 of the upper and lower commutator members 44 and 45, are 120 degrees apart, it being understood that the field coil brushes 64 and 65, like the brush 61, track only with the contact surfaces of the skirts of the commutator members. The field coil brushes 61, 64, and 65 respectively have leads 66, 67, and 68 which are connected to field coils that will presently be described.

Turning now to FIG. 3, it will be observed that each of the upstanding posts 11, 12, and 13 formed on the frame plate 10 is of identical cross-sectional shape. The post 11 has a pair of planar inner walls 11a and 11b of equal width which converge with each other at an angle of 120 degrees, and the posts 12 and 13 respectively have like inner walls 12a and 12b, and 13a and 13b. Thus, the adjacent walls 11b and 12a are parallel to each other and their planes are equidistant from the axis of the shaft 35. This same relationship exists between the walls 12b and 13a, and 13b and 11a, as seen in FIG. 3. Thus, inasmuch as the walls 11a, 11b, 12a, 12b, 13a, and 13b are perpendicular to the plates 10 and 14, these walls, in combination with the plates 10 and 14, provide three radially-inwardly-directed passages in the frame of the motor that are arranged symmetrically and circumferentially about the path of rotation of the permanent magnet 41, the longitudinal axes of the passages intersecting at the axis of the shaft 35. The four walls of each passage serve to confine in each passage one of the three identical field coil holders or bobbins 70, 71, and 72 that were previously mentioned.

Figure 4:
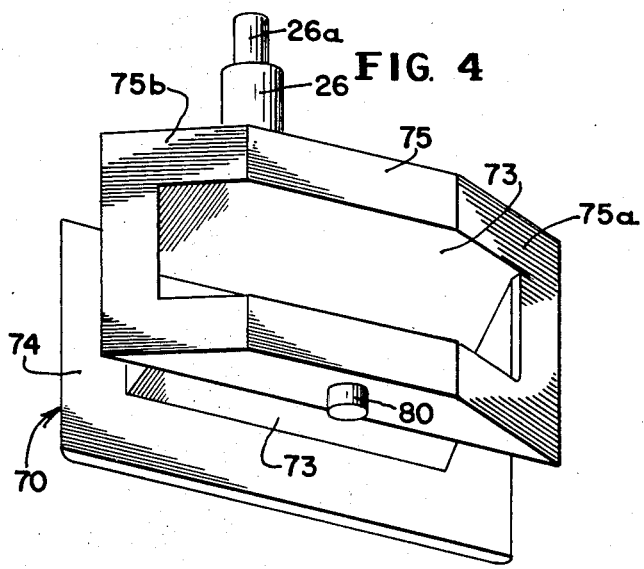
FIG. 4 is a greatly-enlarged perspective view of one of the field coil holders, with the wire coil omitted therefrom, the view showing the inner end of the coil holder in the foreground.

FIG. 4 is a perspective view of one of the three identical bobbins, the view being taken from below the bobbin with the inner end thereof being in the foreground. The bobbins are of molded synthetic, nonmagnetic, organic plastic, such as nylon, and it will be seen that each bobbin is comprised of a hollow longitudinally-extending tube 73 of substantially rectangular cross section having formed on its outer end a flange 74 of rectangular shape. Similarly, the inner end of the tube has formed thereon a heavy flange 75, the side edges 75a and 75b of which are mitered at an angle of 60 degrees with respect to the longitudinal axis of the tube 73 (see FIG. 3). The bobbin 70 has a field coil 76 wrapped about its tube 73 between the inner and outer flanges 74 and 75, and the bobbins 71 and 72 respectively have identical field coils 77 and 78 wrapped thereabout. The four outer edges of the outer and inner flanges 74 and 75 of each bobbin rest against the inner walls of the previously-mentioned passages in the frame, and the bobbins are retained therein by the previously-mentioned pins 26, 27, and 28 which are integrally formed on the upper sides of the inner flanges 75 and which extend upwardly through the plate 14. The underside of the flanges 75 also have a shorter depending pin 80 formed thereon, each of which resides in a corresponding opening (not shown) in the plate 10, thereby assisting in orienting and retaining the bobbins, and thus the field coils in place. The bobbins, as illustrated in FIG. 3 in their assembled positions, abut each other at their mitered surfaces 75a and 75b, and the bobbins are positioned radially outwardly from the axis of the shaft 35 a distance such that the opposite ends of the permanent magnet 41 pass laterally through the open inner ends of the bobbins during rotation of the magnet (see FIGS. 3 and 8), and thus also through the open air cores of the field coils 76, 77, and 78. As a result, it will be understood that a major portion of the path of rotation of the magnet 41 lies within the open cores of the bobbins where the flux density of the field coils is high when the coils are energized.

Figure 8:
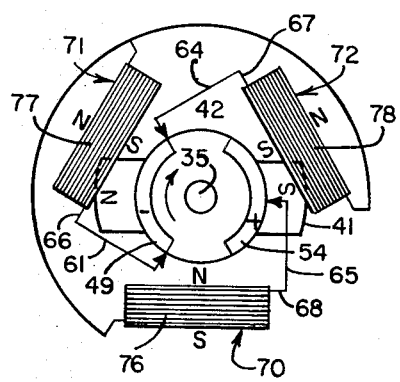
Figure 11:
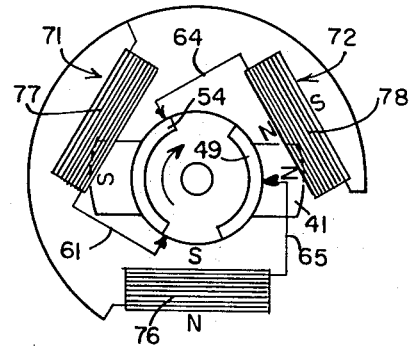

The field coils 76, 77, and 78 are all wound in the same direction with relatively-fine copper wire or the like, and from FIG. 8 it will be observed that the lead or conductor 66 connects the field coil brush 61 to one end of the field coil 77. Similarly, the lead 67 connects the brush 64 to one end of the field coil 72, and the lead 68 connects the brush 65 to one end of the coil 70. The other ends of the field coils are all joined together by a common conductor 85.

FIGS. 8 to 13 are schematic views showing, in progressive increments of 60 degrees, the way the motor operates during one complete revolution. It will be observed that the permanent magnet is fixed on the shaft 35, so that its polar axis is in alignment with the centers of the commutator contacts 49 and 54, with the north pole of the magnet adjacent the contact 49 and with the south pole of the magnet adjacent the contact 54. If we assume, as we previously have done herein, that the contact 49 is connected to the negative terminal of the direct current power source by virtue of the power brush 58, and that the contact 54 is connected to the positive terminal of the power source by virtue of the power brush 57, and if we also assume that the rotor is in the position shown in FIG. 8 at the moment of start, we see that all three of the field coils 76, 77, and 78 are momentarily energized, but with the polarity of the field coil 76 being opposite that of the other two coils. Both the coils 77 and 78 will momentarily be energized because the armature contacts of both brushes 61 and 64 are in contact with the commutator contact 49. This condition will exist only for a moment, however, for the inner or south pole of the coil 77 will attract the north pole of the permanent magnet 41, the inner or south pole of the coil 78 will repel the adjacent south pole of the magnet, and the inner or north pole of coil 76 will tend to attract the south pole of the magnet, all of which will instantly start the rotor of the motor turning in the clockwise direction shown by the arrow in FIG. 8. Immediately after start, the brush 61 will break contact with the commutator contact 49, thereby de-energizing the coil 77, but the coils 76 and 78 will remain energized.

Figure 9:
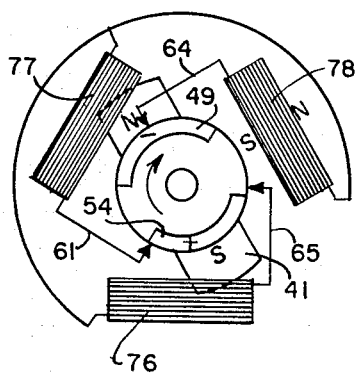
Figure 12:
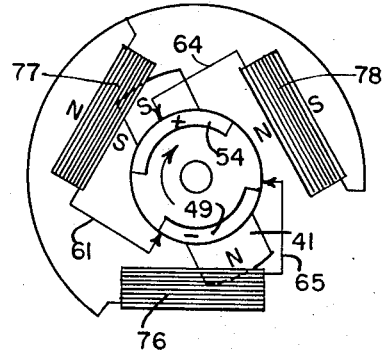
Figure 10:
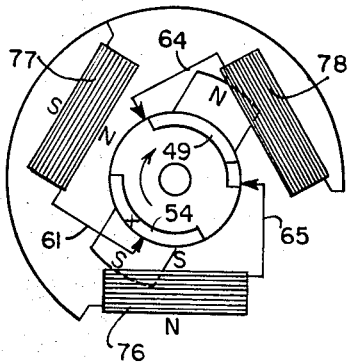
Figure 13:
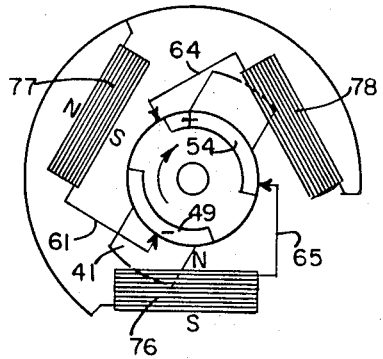

When the rotor has moved about 60 degrees from the position of FIG. 8 to that of FIG. 9, the brush 65 will have broken contact with the commutator contact 54, thereby de-energizing coil 76, and shortly before this will have happened the brush 61 will have made contact with the commutator 54, thereby energizing coil 77 so that its inner end becomes a north pole. In this condition, as seen in FIG. 9, the inner end of the coil 77 will repel the adjacent north pole of the permanent magnet while the inner end of the coil 78 both attracts the north pole of the magnet 41 and repels the south pole thereof. These forces, of course, continue to apply rotative force to the rotor.

It would needlessly extend the present specification to describe in detail the condition existing in each of the subsequent FIGS. 10 to 13, for it will be understood by those skilled in the art how and why the motor continues to rotate through these views, and it will also be understood, from the polarity markings "N" and "S" used in these views, which coils are energized and what their polarities are.

In studying the sequence of views in FIGS. 8 to 13, however, it will be observed that, in every position of the motor rotor, there are always at least two of the field coils energized that the energized coils are in electrical series with each other and that they are of opposite polarities. These facts absolutely insure a positive start, regardless of the position in which the rotor may have stopped, and they also, together with the structural arrangement described above, contribute to the smooth running and high efficiency of the motor.

The efficiency of the present motor is especially surprisingly and unexpectedly high. When the motor is designed for three-volt operation on a pair of ordinary flashlight batteries, and with each field coil having 1,100 turns of 37-gauge copper wire thereon, it has been found that the motor, after two months of constant running, has caused the voltage of the batteries to drop only 0.75 volt. The amperage drawn by the motor was found to be only 2 milliamperes during this running. Furthermore, the motor was self-starting at 0.6 volt (at no load) and would continue to run on as little as 0.4 volt. At 3 volts, the motor, without a gear train, produced an unexpectedly-high stall torque of 8 ounce-inches, and with a gear train would produce from 50 to 60 ounce-inches of stall torque while drawing only 35 milliamperes of current.

In another model of the motor designed for 3-volt operation, wherein the field coils each comprised 950 turns of No. 36 copper wire, the normal rotor speed was 1,250 r.p.m., the motor would start at 0.6 volt and would continue to run on as low as 0.4 volt. The normal running current was only 2.5 milliamperes and, with a gear train giving a speed reduction of 268 to 1, the motor produced a stall torque of 7.5 ounce-inches while drawing only 36 milliamperes.

Efficiencies such as the foregoing, it is believed, have never before been achieved in small direct-current, impulse-type electric motors. This, taken with the extremely-inexpensive construction employed in the present motor and the obvious ease and simplicity with which it may be assembled, renders the present invention a highly-important development in the art.

Although one preferred embodiment of the invention has been described above for purposes of illustration, it will be understood that the number of field coils need not be limited to three, and that various other changes and modifications may be made in the motor without departing from the spirit and scope of the invention defined in the appended claims.

I claim:

1. An impulse-type direct current electric motor adapted to be driven by small direct current batteries or the equivalent, comprising a frame, a permanent magnet mounted for rotation within said frame about an axis perpendicular to the polar axis of said magnet, said frame having a plurality of at least three passages therein directed radially inwardly toward said axis of rotation and arranged symmetrically and circumferentially about the path of rotation of said permanent magnet, a plurality of at least three annular open-core coil holders of nonmagnetic material respectively mounted in said passages, said coil holders being spaced radially outwardly from said axis of rotation a distance such that the opposite end portions of said magnet pass laterally through the open inner ends of said coil holders during rotation of said magnet and such that a major portion of the path of rotation of said magnet lies within said open cores of said coil holders where the flux density of said field coils is high, the respective axes of said coil holders intersecting substantially at said axis of rotation and being substantially perpendicular thereto, a plurality of at least three field coils of wire respectively wrapped about said coil holders, the respective polar axes of said field coils intersecting substantially at the axis of rotation of said permanent magnet, a commutator driven by the rotation of said permanent magnet and having a cylindrical surface with two conductive regions circumferentially alternating with two insulating regions, means for coupling a source of DC voltage continuously across said conductive regions, and at least three contacts respectively electrically connected to said field coils and in constant contact with said cylindrical surface, whereby during each cycle of rotation of said commutator each field coil is of one magnetic polarity followed by being neutral followed by being of an opposite magnetic polarity followed by again being neutral, said conductive and insulating regions being constructed and arranged to cause substantially continuous sequential energization of pairs of immediately-adjacent field coils respectively to impress opposite magnetic polarities thereon so as rotatively to drive said permanent magnet.

2. An electric motor comprising a permanent magnet mounted for rotation about an axis perpendicular to its polar axis, at least three field coils symmetrically disposed circumferentially about the path of rotation of said permanent magnet, the respective polar axes of said field coils intersecting substantially at said axis of rotation of said permanent magnet, a commutator driven by the rotation of said permanent magnet and having a cylindrical surface with two conductive regions circumferentially alternating with two insulating regions, means for coupling a source of DC voltage continuously across said conductive regions, and at least three contacts respectively electrically connected to said field coils and in constant contact with said cylindrical surface, whereby during each cycle of rotation of said commutator each field coil is of one magnetic polarity followed by being neutral followed by being of an opposite magnetic polarity followed by again being neutral, said conductive and insulating regions being constructed and arranged to cause substantially continuous sequential energization of pairs of immediately-adjacent field coils respectively to impress opposite magnetic polarities thereon so as rotatively to drive said permanent magnet.

3. The electric motor set forth in claim 2, wherein each of said conductive regions has an arcuate extent of on the order of 120° and each of said insulating regions has an arcuate extent of on the order of 60°.

4. The electric motor set forth in claim 2, wherein said cylindrical surface also includes two circumferentially continuous further conductive regions respectively electrically connected to said first-mentioned conductive regions, and said coupling means includes a pair of further contacts respectively electrically connected to the DC source and respectively in constant contact with said further conductive regions.

References Cited
UNITED STATES PATENTS

| | | | |
|---|---|---|---|
| 467,215 | 1/1892 | White | 310—236 |
| 2,853,637 | 9/1958 | Ishikawa | 310—46 |
| 1,239,588 | 1/1916 | Gilbert et al. | 310—237 |
| 2,301,425 | 11/1942 | List | 310—MM |
| 2,999,176 | 9/1961 | Lindstrom et al. | 310—43 |
| 3,121,811 | 2/1964 | Marti et al. | 310—48 |
| 129,085 | 7/1872 | Barjon | 310—236 |
| 2,181,842 | 10/1938 | MacKay | 310—46 |

JOSEPH V. TRUHE, Primary Examiner

L. A. ROUSE, Assistant Examiner

U.S. Cl. X.R.

310—46